United States Patent [19]

Sakai et al.

[11] Patent Number: 5,288,279
[45] Date of Patent: Feb. 22, 1994

[54] HYDRAULIC CONTROL SYSTEM FOR AUTOMATIC TRANSMISSION

[75] Inventors: Hiromasa Sakai; Toshikazu Oshidari, both of Kanagawa, Japan

[73] Assignee: Nissan Motor Co., Ltd., Yokohama, Japan

[21] Appl. No.: 943,189

[22] Filed: Sep. 14, 1992

[30] Foreign Application Priority Data

Sep. 18, 1991 [JP] Japan ................. 3-236700
Apr. 7, 1992 [JP] Japan ................. 4-085347

[51] Int. Cl.$^5$ ........................................ B60K 41/10
[52] U.S. Cl. .......................... 475/127; 475/128; 475/131
[58] Field of Search ............... 192/109 F; 475/128, 475/133, 131, 132, 127

[56] References Cited

U.S. PATENT DOCUMENTS

| | | | |
|---|---|---|---|
| 3,861,241 | 1/1975 | Hancock | 475/131 X |
| 4,233,860 | 11/1980 | Kadelbach et al. | 475/131 OR |
| 4,422,536 | 12/1983 | Shatuck | 475/128 X |
| 4,579,020 | 4/1986 | Sugano | 475/128 X |
| 4,941,370 | 7/1990 | Ishii | 475/128 OR |
| 5,117,953 | 6/1992 | Machida et al. | 192/109 F |

*Primary Examiner*—Leslie A. Braun
*Assistant Examiner*—Daniel Wittels
*Attorney, Agent, or Firm*—Foley & Lardner

[57] ABSTRACT

A fail-safe hydraulic control system for an automatic transmission for a vehicle is provided. This fail-safe system includes generally a frictional element which is operable to establish a reverse mode in the transmission for allowing the vehicle to move backward, a manual valve responsive to shifting operation of a selector lever to a reverse position for directing fluid pressure from a pressure power source to a reverse position pressure line, a pressure control valve for modifying hydraulic pressure supplied from the pressure power source for providing a preselected pressure level required for actuating the frictional element, an automatic transmission control unit responsive to the selector lever shifting operation to the reverse position to provide a control signal to the pressure control valve for providing the preselected pressure level to the frictional element within a given period of time, and a pressure delay circuit for establishing fluid communication between the reverse position pressure line and the frictional element to provide the preselected pressure level to the frictional element after the given period of time following the selector shifting operation to the reverse position. Therefore, the reverse mode is established securely regardless of operational conditions of the frictional element and/or the control unit.

18 Claims, 10 Drawing Sheets

|      | C1 | C2 | C3 | B1 | B2 |
|------|----|----|----|----|----|
| R    |    |    | O  |    | O  |
| 1ST  | O  |    |    |    | O  |
| 2ND  | O  |    |    | O  |    |
| 3RD  | O  | O  |    |    |    |
| 4TH  |    | O  |    | O  |    |

|      | C1 | C2 | B1 | B2 | B3 |
|------|----|----|----|----|----|
| R    |    |    | O  |    | O  |
| 1ST  | O  |    |    |    | O  |
| 2ND  | O  |    |    | O  |    |
| 3RD  | O  |    | O  |    |    |
| 4TH  | O  | O  |    |    |    |
| 5TH  |    | O  | O  |    |    |
| 6TH  |    | O  |    | O  |    |

HYDRAULIC CONTROL SYSTEM FOR AUTOMATIC TRANSMISSION

BACKGROUND OF THE INVENTION

1. Field of the Invention

The present invention relates generally to a hydraulic control system for an automatic transmission of an automotive vehicle. More particularly, the invention relates to a fail-safe hydraulic control system which serves to establish a reverse mode securely even when failures occur in frictional elements of an automatic transmission and/or a control circuit.

2. Description of the Prior Art

Japanese Patent First Publication No. 2-120556 discloses an electrically controlled automatic transmission for an automotive vehicle. This transmission includes generally a plurality of frictional elements such as clutches and brakes which are actuated by a hydraulic control system. The hydraulic control system includes solenoid operated pressure control valves which are operable to modify pressure provided from a hydraulic power source to actuate the frictional elements respectively according to a given schedule for establishing preselected gear rations in forward and reverse modes.

However, such a prior art hydraulic control system for an automatic transmission encounters a drawback in that when frictional elements for establishing a reverse mode fail due to breaking of a wire in a control circuit or the so-called spool sticking in solenoid valves, sufficient pressures are not obtained for actuating the frictional elements for moving a vehicle backward even when a driver shifts a selector lever to a reverse position.

SUMMARY OF THE INVENTION

It is therefore a principal object of the present invention to avoid the disadvantages of the prior art.

It is another object of the present invention to provide a fail-safe hydraulic control system for an automatic transmission of an automotive vehicle which is operable to establish a reverse mode securely even when failures occur in a pressure control valve which actuates a reverse mode frictional element of the transmission and/or in a control circuit.

According to one aspect of the present invention, there is provided a fluid control system for an automatic transmission for a vehicle which comprises a frictional element operable to establish a reverse mode in the automatic transmission for allowing the vehicle to move backward, a pressure control valve operable to modify fluid pressure supplied from a pressure power source for providing a preselected pressure level required for actuating the frictional element, a manual valve responsive to shifting operation of a selector lever to a reverse position for establishing fluid communication between the pressure power source and a reverse position pressure line which is connected to said frictional element by-passing the pressure control valve, a control unit responsive to the selector lever shifting operation to the reverse position to provide a control signal to the pressure control valve for providing the preselected pressure level to the frictional element within a given period of time following the selector lever shifting operation, and a pressure delay circuit disposed in the reverse position pressure line for providing the preselected pressure level to the frictional element after the given period of time following the selector lever shifting operation to the reverse position. With the above arrangement, the reverse mode is established securely regardless of operational conditions of the frictional element and/or a control circuit even when failure occurs in the pressure control valve and/or the control circuit.

In the preferred mode, the pressure delay circuit may include an accumulator, an orifice, and a check valve. The accumulator includes an accumulator chamber into which pressure in the reverse position pressure line is introduced through the orifice. The check valve is arranged parallel to the orifice for allowing fluid flow from the accumulator chamber to the manual valve.

According to another aspect of the present invention, there is provided a fluid control system for an automatic transmission for a vehicle which comprises first and second frictional elements operable to establish a reverse mode in the automatic transmission for allowing the vehicle to move backward when both the first and second frictional elements are actuated, a manual valve including first and second manual valve positions, the first manual valve position being to establish fluid communication between a pressure power source and a drive position pressure line when a selector lever is shifted to a drive position for establishing a drive mode allowing the vehicle to move forward, the second manual valve position being to establish fluid communication between the pressure power source and a reverse position pressure line when the selector lever is shifted to a reverse position for establishing the reverse mode, a first pressure control valve connecting between the first frictional element and the drive position pressure line for providing a first preselected pressure level required for actuating the first frictional element in the drive mode, a second pressure control valve connecting between the second frictional element and the reverse position pressure line for providing a second preselected pressure level required for actuating the second frictional element in the reverse mode, a fluid pressure line connecting between the first frictional element and the reverse position pressure line by-passing the second pressure control valve, a control unit responsive to the selector lever shifting operation to the reverse position to provide a control signal to the second pressure control valve for providing the second preselected pressure level to the second frictional element within a given period of time following the selector lever shifting operation, and a pressure delay means communicating between the reverse position pressure line and the second frictional element for providing the second preselected pressure level to the second frictional element after the given period of time following the selector lever shifting operation to the reverse position.

DESCRIPTION OF THE PREFERRED EMBODIMENT

Figure 1:
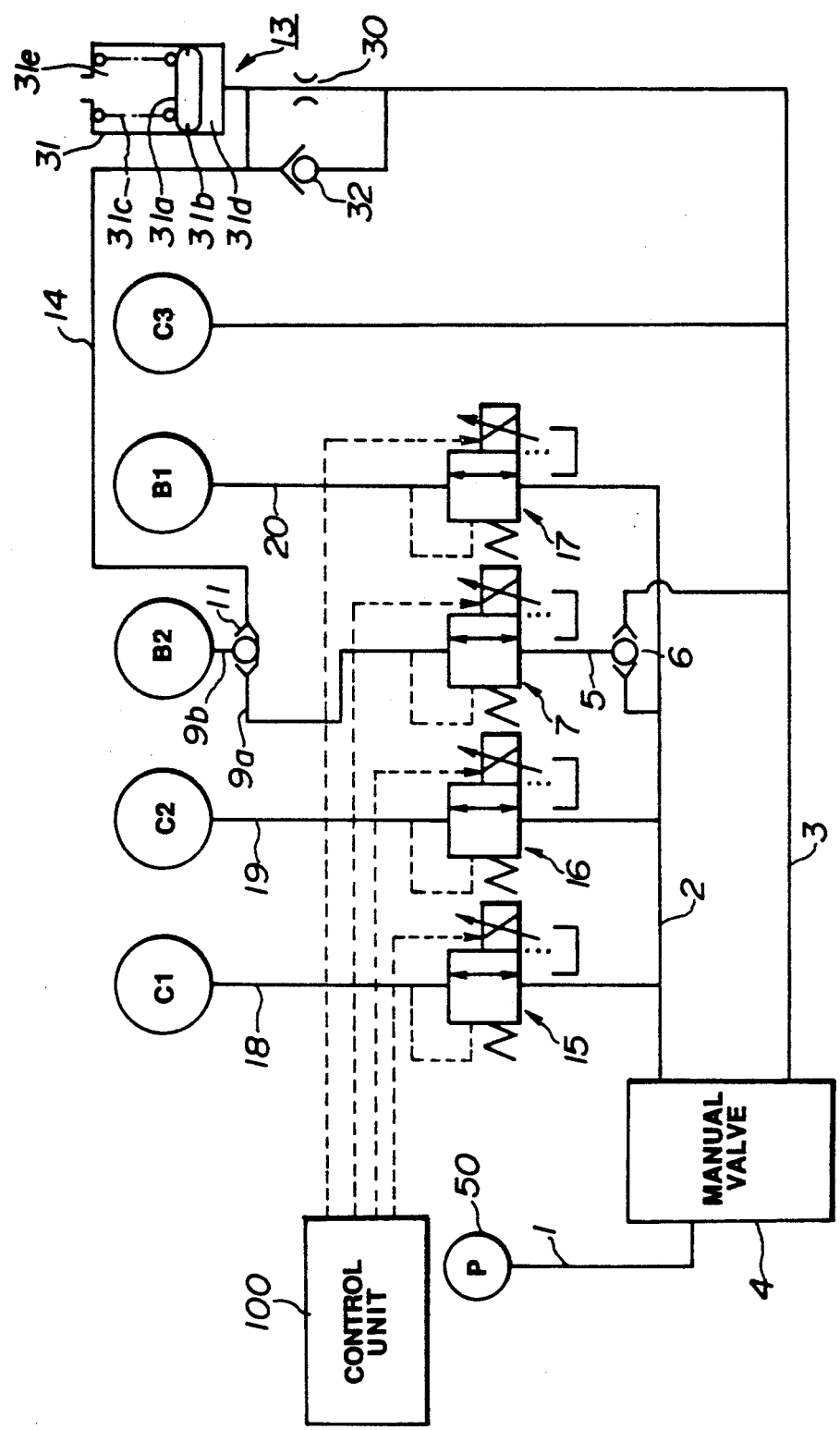
FIG. 1 is a circuit diagram which shows a fail-safe hydraulic control system for an automatic transmission according to the present invention.
Figures 2, 3:
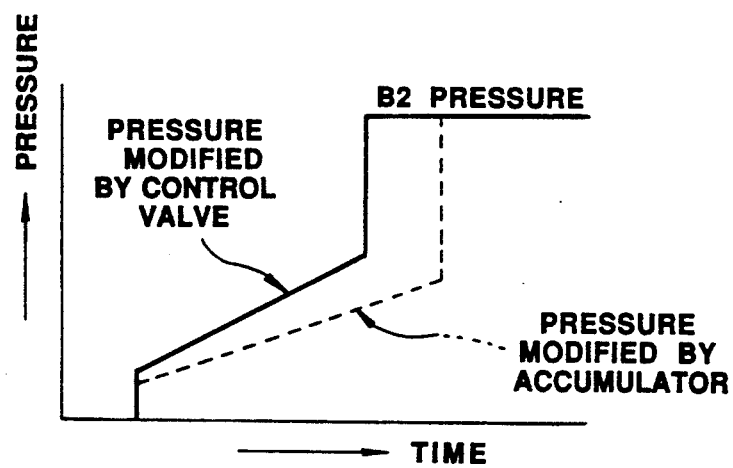
FIG. 2 is a graph which shows the relationship between gear ratios and operative conditions of frictional elements of an automatic transmission.
FIG. 3 is a graph which shows variation in pressure supplied to a frictional element B2 of an automatic transmission.

Referring now to the drawings, particularly to FIG. 1, wherein like numbers refer to like parts in several views, a fail-safe hydraulic control system for an automatic transmission for a vehicle according to the present invention is shown. This fail-safe hydraulic control system serves to control a power train which includes a plurality of frictional elements: a forward clutch C1, a high clutch C2, a reverse clutch C3, a band brake B1, and a low and reverse brake B2. These frictional elements are controlled according to the operative relations, as shown in FIG. 2, to provide four forward speeds and one reverse speed. As seen in FIG. 2, when a driver shifts a selector lever (not shown) to a reverse (R) range, the reverse clutch C3 and the reverse brake B2 are actuated, or engaged respectively to establish a reverse mode for allowing the vehicle to move backward. Additionally, in a drive (D) range, the transmission automatically shifts up or down according to vehicle speed and/or a throttle valve position. When the forward clutch C1 and the low and reverse brake B2 are engaged respectively, the first speed is established. When the forward clutch C1 and the band brake B1 are engaged respectively, the second speed is obtained. When the forward clutch C1 and the high clutch C2 are engaged respectively, the third speed is obtained. When the high clutch C2 and the band brake B1 are engaged respectively, the fourth speed is obtained.

The fail-safe hydraulic control system further includes a manual valve 4, a first shuttle valve 6, electronically-operated pressure control valves (solenoid valves) 15, 16, 7, and 17, a second shuttle valve 11, and a pressure delay means 13. The manual valve 4 is connected to a hydraulic power source 50 and is responsive to a selector shifting operation to the D range to switch its valve position to establish fluid communication between a hydraulic line 1 and a D-range hydraulic line 2 for directing line pressure supplied from the hydraulic power source 50 through a pressure regulator (not shown) to the hydraulic line 2, and is also responsive to a selector shifting operation to the R range to establish fluid communication between the hydraulic line 1 and a R-range hydraulic line 3 for directing the line pressure to the latter. The first shuttle valve 6 is arranged between the D-range and R-range hydraulic lines 2 and 3 and a hydraulic line 5 connected to the pressure control valve 7 and is operable to switch its valve position according to a pressure difference between the D-range and R-range hydraulic lines 2 and 3. The pressure control valves 15, 16, and 17 are connected to the D-range hydraulic line 2 and serve to regulate the pressure in the D-range hydraulic line 2 according to control signals having preselected duty ratios output from an automatic transmission (A/T) control unit 100 to control engagement forces of the forward clutch C1, the high clutch C2, and the band brake B1 of the automatic transmission through hydraulic lines 18, 19, and 20 respectively. Likewise, the pressure control valve 7 is connected to the low and reverse brake B2 through a second shuttle valve 11 and operable to modify the pressure from the first shuttle valve 6 according to a control signal having a preselected duty ratio from the A/T control unit 100 to control engagement force of the low and reverse brake B2. The second shuttle valve 11 selectively communicates between the low and reverse brake B2 and the pressure control valve 7 through hydraulic lines 9a and 9b and between the low and reverse brake B2 and the pressure delay means 13 through the hydraulic line 9b and a R-range pressure delay line 14. The R-range pressure delay line 14 is connected to the pressure delay means 13 which serves to retard elevation in hydraulic pressure in the line 14 by a preselected period of time after the shifting operation to the R range. To the reverse clutch C3, the pressure in the R-range hydraulic line 3 is supplied directly.

The pressure delay means 13 includes generally an orifice (i.e., a restrictor) 30, a check valve 32 arranged parallel to the orifice 30, and a spring type accumulator 31. The accumulator 31 includes a piston 31a, a seal ring 31b, a spring 31c, an accumulator chamber 31d, and a drain chamber 31e. The accumulator chamber 31d is connected to the R-range hydraulic line 3 through the orifice 30 and to the R-range pressure delay line 14 directly.

The pressure delay means may alternatively be provided with a delay valve which is operable to provide the R-range pressure quickly after a preselected delay time expires.

In operation, when a driver shifts the selector lever to the R range, the manual valve 4, as mentioned above, switches its valve position to establish fluid communication between the hydraulic line 1 and the R-range hydraulic line 3 for elevating pressure in the R-range hydraulic line toward a preselected pressure level. This elevated pressure in the R-range hydraulic line 3 is then directed to the reverse clutch C3 to engage it and acts on the first shuttle valve 6 which establishes fluid communication between the R-range hydraulic line 3 and the hydraulic line 5, directing the R-range pressure to the pressure control valve 7. The A/T control unit 100 is responsive to the selector shifting operation to the R-range to provide a control signal to the pressure control valve 7 so that the pressure from the first shuttle valve 6 is elevated toward a preselected pressure level at a given rate within a preselected period of time based on a duty ratio of the control signal to be supplied to the low and reverse brake B2 through the second shuttle valve 11 for establishing the reverse mode.

The elevation in the controlled pressure to the low and reverse brake B2 is, as shown by a solid line in FIG. 3, controlled at a relatively low rate, thereby preventing uncomfortable shock, caused by operations of the frictional elements when the selector lever is shifted to the R range, from occurring.

In addition, the pressure in the D-range hydraulic line 3 is directed to the accumulator 31 through the orifice 30 while being restricted from rising rapidly. The pressure introduced into the accumulator chamber 31d then acts on the piston 31a to be urged upwardly, as viewed in the drawing, when the internal pressure of the accumulator chamber 31d overcomes the reaction force resulting from friction between the seal ring 31b and an inner wall of the accumulator chamber 31d and spring force on the spring 31c. After the preselected period of time during which the pressure modified by the pressure control valve 7 is increased toward the preselected pressure level required for actuating the low and reverse brake B2, the piston 31a reaches a stroke end position so that the internal pressure of the accumulator chamber 31d is elevated toward a maximum pressure corresponding to the pressure in the R-range hydraulic line 3 (i.e., the preselected pressure level for actuating the low and reverse brake B2).

The pressure regulated by the pressure delay means 13 is, as shown by a broken line in FIG. 2, varied at a rate lower than that of the pressure control valve 7 so that the second shuttle valve 11 maintains its valve position to establish fluid communication between the hydraulic lines 9a and 9b for the preselected period of time during which the pressure modified by the pressure control valve 7 reaches the preselected pressure level. Therefore, the pressure controlled by the pressure control valve 7 is usually supplied to the low and reverse brake B2 for actuating it.

When the selector lever is shifted to a neutral (N) range from the R range, the pressure in the R-range hydraulic line 3 is discharged from a drain port (not shown) of the manual valve 4. The piston 31a is thus urged downward, as viewed in FIG. 1, by the spring force of the spring 31c, discharging working fluid, or oil stored in the accumulator chamber 31d from the drain port quickly through the check valve 32.

Generally, when failure occurs in the pressure control valve 7 due to breaking of a wire in a control circuit or spool sticking for example, the pressure control valve 7 provides no pressure to the low and reverse brake B2 even when the selector lever is shifted to the R range. The low and reverse brake B2 thus remains disengaged. However, in the fail-safe hydraulic control system of the invention, the pressure delay means 13 elevates pressure in the R-range pressure delay line 14 toward the R-range pressure after the preselected period of time following the selector shifting operation to the R range. With this elevated pressure, the valve position of the second shuttle valve 11 is switched to establish fluid communication between the hydraulic lines 14 and 9b so that the low and reverse brake B2 is actuated. It will be appreciated that the reverse mode is established securely even when the failure occurs in the pressure control valve 7.

As mentioned above, the pressure regulated by the pressure delay means 13 is varied at a relatively low rate. Thus, the low and reverse brake B2 is engaged slowly, preventing uncomfortable large scale shock from occurring.

Figure 4:
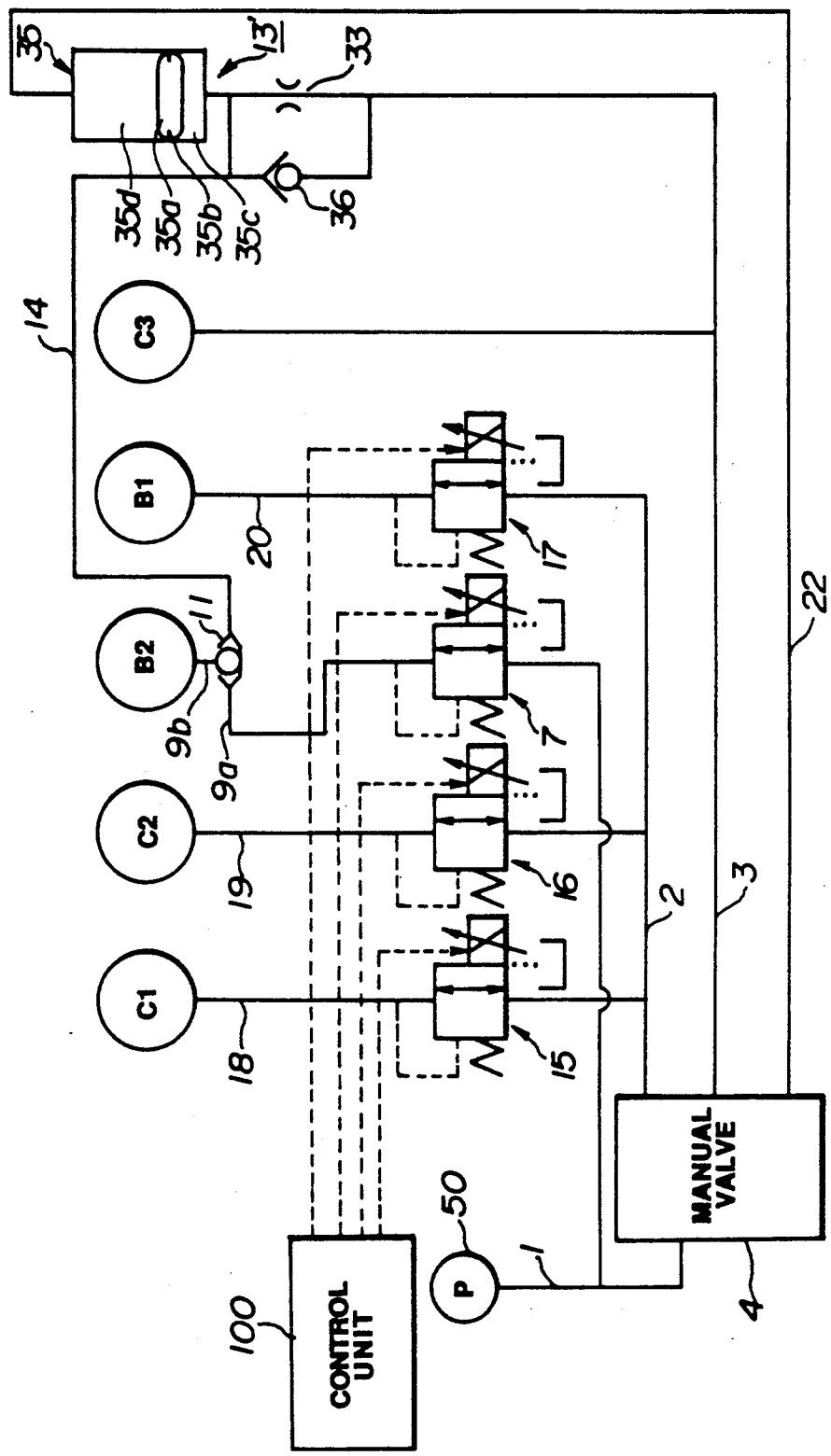
FIG. 4 is a circuit diagram which shows a fail-safe hydraulic control system for an automatic transmission of a second embodiment.

Referring to FIG. 4, there is shown a fail-safe hydraulic control system of a second embodiment which controls a power train with four forward speeds and one reverse speed. This fail-safe hydraulic control system is different from the above mentioned first embodiment in that a pressure delay means 13' includes an accumulator 35 into which back pressure is introduced and a pressure control valve 7 is connected to a hydraulic line 1 directly. Other arrangements and operation are the same as the first embodiment and thus explanation thereof in detail will be omitted here.

The pressure delay means 13' includes generally the accumulator 35, an orifice 33 arranged in series, and a check valve 36 arranged parallel to the orifice 33. The accumulator 35 includes a piston 35a having disposed ring 35b in its circumferential surface. The piston 35a defines in the accumulator an accumulator chamber 35c and a back pressure chamber 35d into which pressures provided in the N range and the P range are introduced through a N/P range hydraulic line 22 respectively.

Figures 5, 9:
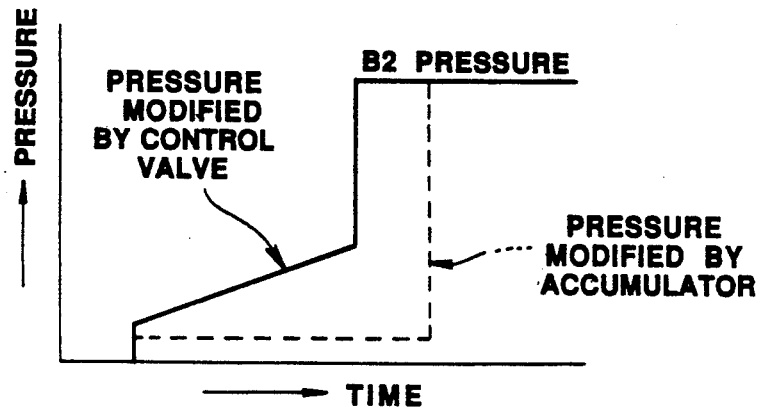
FIG. 5 is a graph which shows variation in pressure supplied to a frictional element B2 in a second embodiment.
FIG. 9 is a graph which shows the relationship between gear ratios and operative conditions of frictional elements of an automatic transmission according to a fifth embodiment.

In operation, when a selector lever is shifted to the R range, a manual valve 4 establishes fluid communication between the hydraulic line 1 and the R-range hydraulic line 3 to provide line pressure to the accumulator chamber 35c, while pressure in the back pressure chamber 35d is maintained at a lower level. Therefore, the pressure introduced into the accumulator chamber 35c acts on the piston 35a to be biased upward, as viewed in the drawing, against the reaction force caused by friction between the seal ring 35b and an inner wall of the accumulator 35 so that pressure in an R-range pressure delay line 14 is, as shown by a broken line in FIG. 5, maintained substantially constant for a preselected period of time and then is increased quickly toward a maximum pressure corresponding to the R-range pressure at a time when the piston 35a reaches the stroke end position. As seen in FIG. 5, the pressure in the R-range pressure delay line 14 is maintained at a level for the preselected period time which is lower than the pressure regulated by the accumulator 31 of the first embodiment. This is due to the fact that during a stroke of the piston 35a, the internal pressure of the accumulator chamber 31d is balanced with the reaction force created by only the friction of the seal ring 31b.

As already mentioned, in the first embodiment, the spring 31c is provided for returning the piston 31a to discharge pressure in the accumulator chamber 31d from the drain port of the manual valve 4 when the selector lever is shifted from the R range to another. Thus, a degree of spring force of the spring 31c which at least exceeds the reaction force due to the friction between the seal ring 31b and the inner surface of the accumulator 31 is necessary for displacing the piston 31a. Consequently, a pressure level in the accumulator chamber 31d during a piston stroke becomes at least twice the reaction force. In contrast to this, the accumulator 35 of the second embodiment has no spring and thus pressure in the accumulator chamber 35c during a piston stroke is determined by only a degree of friction between the seal ring 35b and the inner surface of the accumulator 35 so that a pressure level in the accumulator chamber 35c is maintained at a level lower than the first embodiment during the piston stroke. Accordingly, a relatively small-sized accumulator which includes a piston having a smaller pressure receiving area and a low and reverse brake may be utilized, resulting in pressure consumption being reduced.

When the selector lever is shifted from the R range to the N or P ranges for example, the pressure in the hydraulic line 22 is introduced into the back pressure chamber 35d of the accumulator 35 to increase internal pressure thereof, thereby urging the piston 35a downward, as viewed in the drawing, to discharge the pressure in the accumulator chamber 35c from a drain port of the manual valve 4 through the check valve 36.

Figure 6:
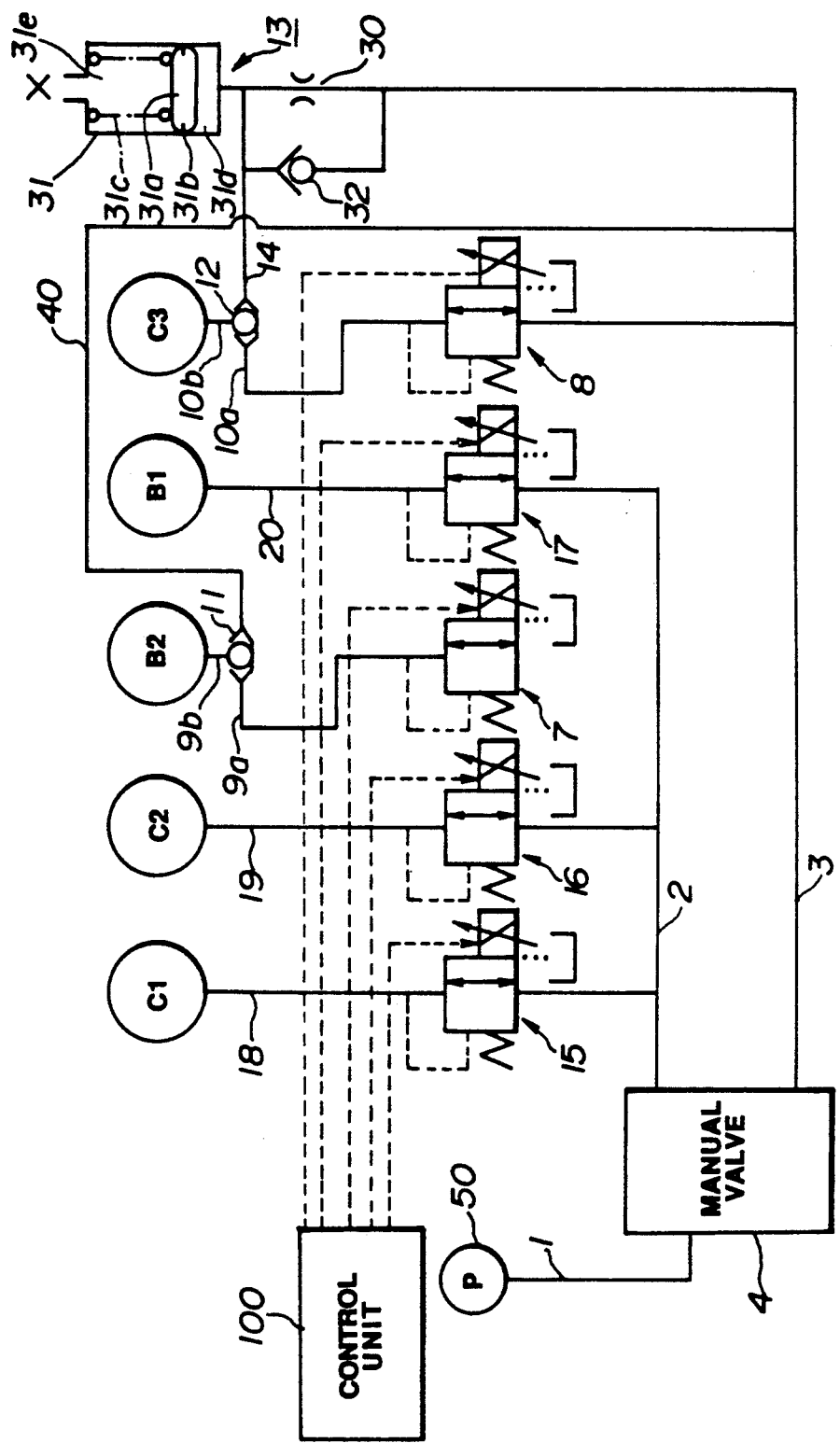
FIG. 6 is a circuit diagram which shows a fail-safe hydraulic control system for an automatic transmission of a third embodiment.

Referring to FIG. 6, a third embodiment of a fail-safe hydraulic control system for an automatic transmission is shown. In this fail-safe system, a pressure control valve 7 is connected to a D-range hydraulic line 2 directly and is actuated only when a selector lever is shifted to the D range. In the R range, the pressure in a R-range hydraulic line 3 is supplied to a low and reverse brake B2 directly through a hydraulic line 40.

Additionally, a pressure control valve 8 is provided which connects between the R-range hydraulic line 3 and a reverse clutch C3. A second shuttle valve 12 is arranged downstream from the reverse clutch C3 and communicates with the pressure control valve 8 through a line 10b and a spring type accumulator 31, an orifice 30, and a check valve 32 through a R-range pressure delay line 14. Other arrangements are the same as the first embodiment and thus explanation thereof in detail will be omitted here.

In operation, when a selector lever is shifted to the R range, the pressure in the R-range hydraulic line 3 is directed to the shuttle valve 11 directly to switch its valve position for establishing fluid communication between a line 9b and the hydraulic line 40 so that the low and reverse brake B2 is engaged. Additionally, an A/T control unit 100 is responsive to the selector shifting operation to the R range to output a control signal having a preselected duty ratio to the pressure control valve 8 for providing controlled pressure to the reverse clutch C3 through the second shuttle valve 12. The pressure elevation of the controlled pressure is regulated so as to prevent uncomfortable shock from occurring due to a gear shifting operation into the R range.

When failure occurs in the pressure control valve 8, as already mentioned in the first embodiment, the pressure in the R-range pressure delay line 14 is supplied to the reverse clutch C3 through the R-range pressure delay line 14 for engaging the reverse clutch C3 completely after a piston 31a is displaced toward a piston end position. It will be noted that a reverse mode is established securely regardless of operational condition of the pressure control valve 8.

In the third embodiment, the pressure control valves 15, 16, 7, and 17 are, as mentioned already, provided exclusively for a forward mode, while the pressure control valve 8 is provided exclusively for a reverse mode. Therefore, fine pressure modification in the forward and reverse modes may be made independently of each other.

Figure 7:
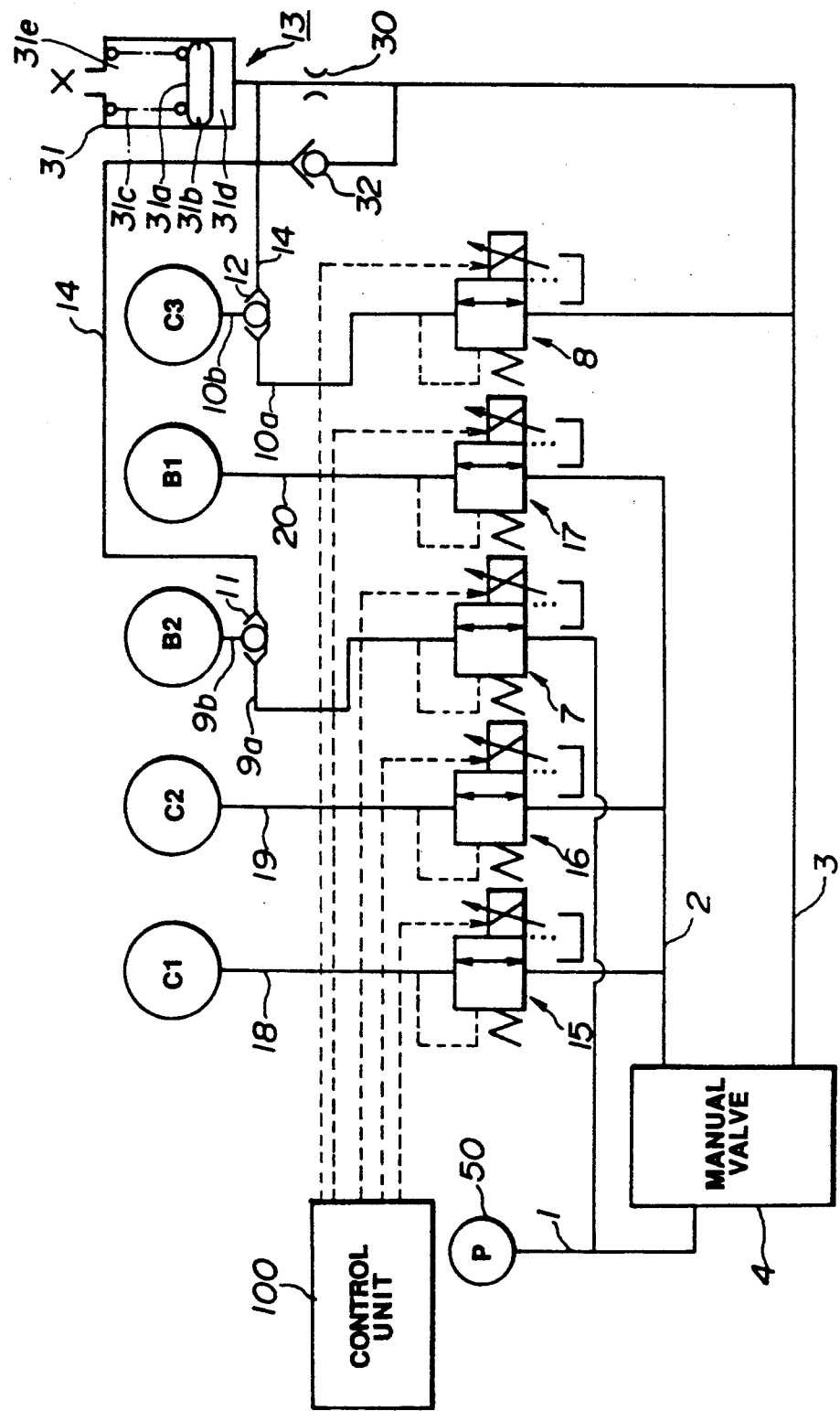
FIG. 7 is a circuit diagram which shows a fail-safe hydraulic control system for an automatic transmission of a fourth embodiment.

Referring to FIG. 7, a fourth embodiment of a fail-safe hydraulic control system for an automatic transmission is shown. This fail-safe hydraulic control system is different from the above third embodiment in that a pressure control valve 7 communicates with a hydraulic line 1 directly and an R-range pressure delay line 14 is connected to a low and reverse brake B2 and a reverse clutch C3 through shuttle valves 11 and 12 respectively.

In operation, when a selector lever is shifted to the R range, the control unit 100 provides control signals to the pressure control valves 7 and 8 respectively. The pressure control valve 7 then modifies line pressure to be supplied to the low and reverse brake B2, while the pressure control valve 8 modifies pressure in the R-range hydraulic line 3 to be supplied to the reverse clutch C3.

When the pressure control valves 7 and 8 are failed, the pressure in the R-range pressure delay line 14 is supplied to both the low and reverse brake B2 and the reverse clutch C3 after a preselected period of time following a selector shifting operation to the R range. It will be noted that a reverse mode is established securely regardless of operational conditions of the pressure control valves 7 and 8, and that a degree of pressure control in the R range may be adjusted precisely.

Figure 8:
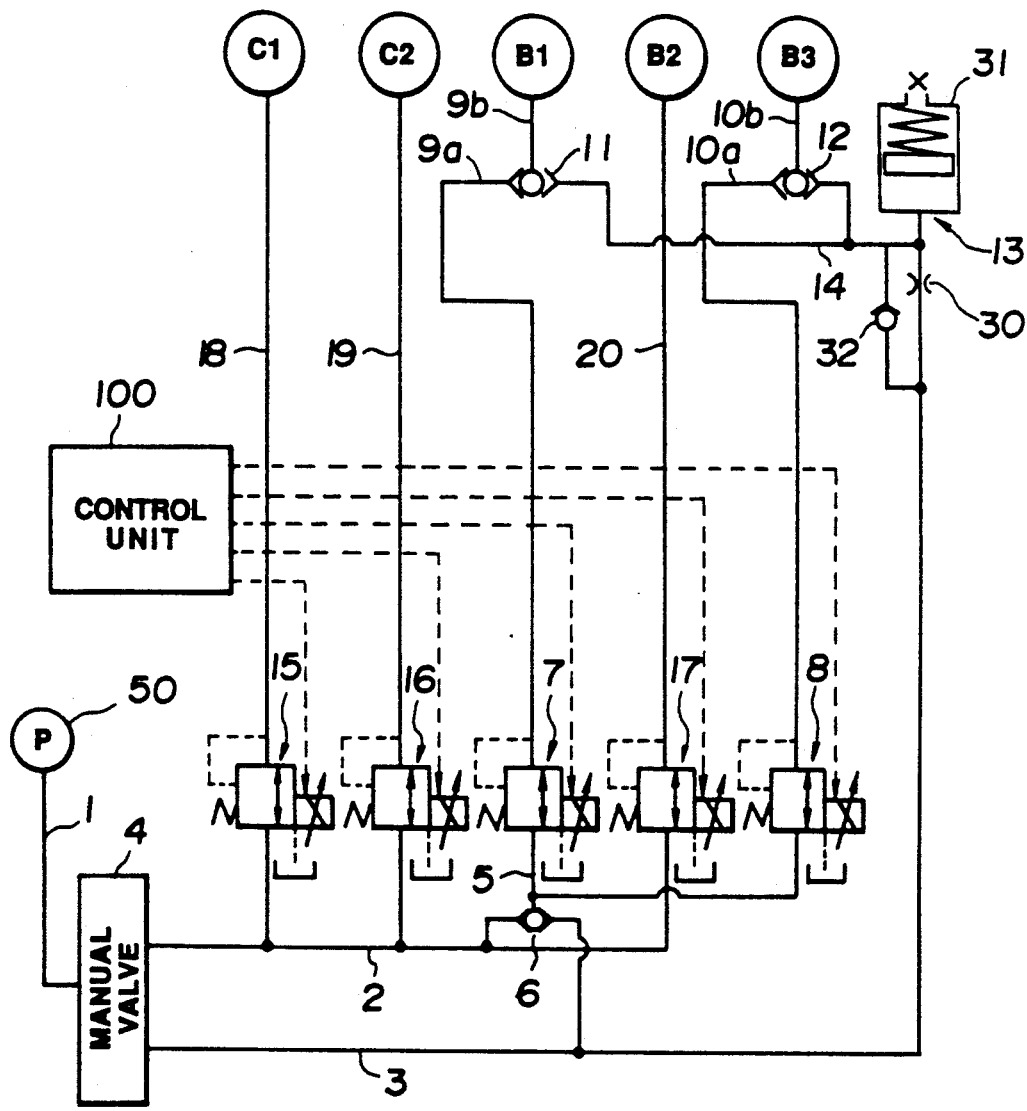
FIG. 8 is a circuit diagram which shows a fail-safe hydraulic control system for an automatic transmission of a fifth embodiment.

Referring to FIG. 8, a fifth embodiment of a fail-safe hydraulic control system for an automatic transmission is shown. This fail-safe hydraulic control system serves to control a power train according to the operative conditions of frictional elements, as shown in FIG. 9, for providing six forward speeds and one reverse speed. When a selector lever is shifted to the R range, an A/T control unit 100 provides control signals to frictional elements B1 and B3 to be engaged respectively to establish a reverse mode. In the D range, engaging the frictional elements C1 and B3 respectively provides the first speed, engaging the frictional elements C1 and B2 respectively provides the second speed, engaging the frictional elements C1 and B1 respectively provides the third speed, engaging the frictional elements C1 and C2 respectively provides the fourth speed, engaging the frictional elements C2 and B1 respectively provides the fifth speed, and engaging the frictional elements C2 and B2 respectively provides the sixth speed.

Figure 10:
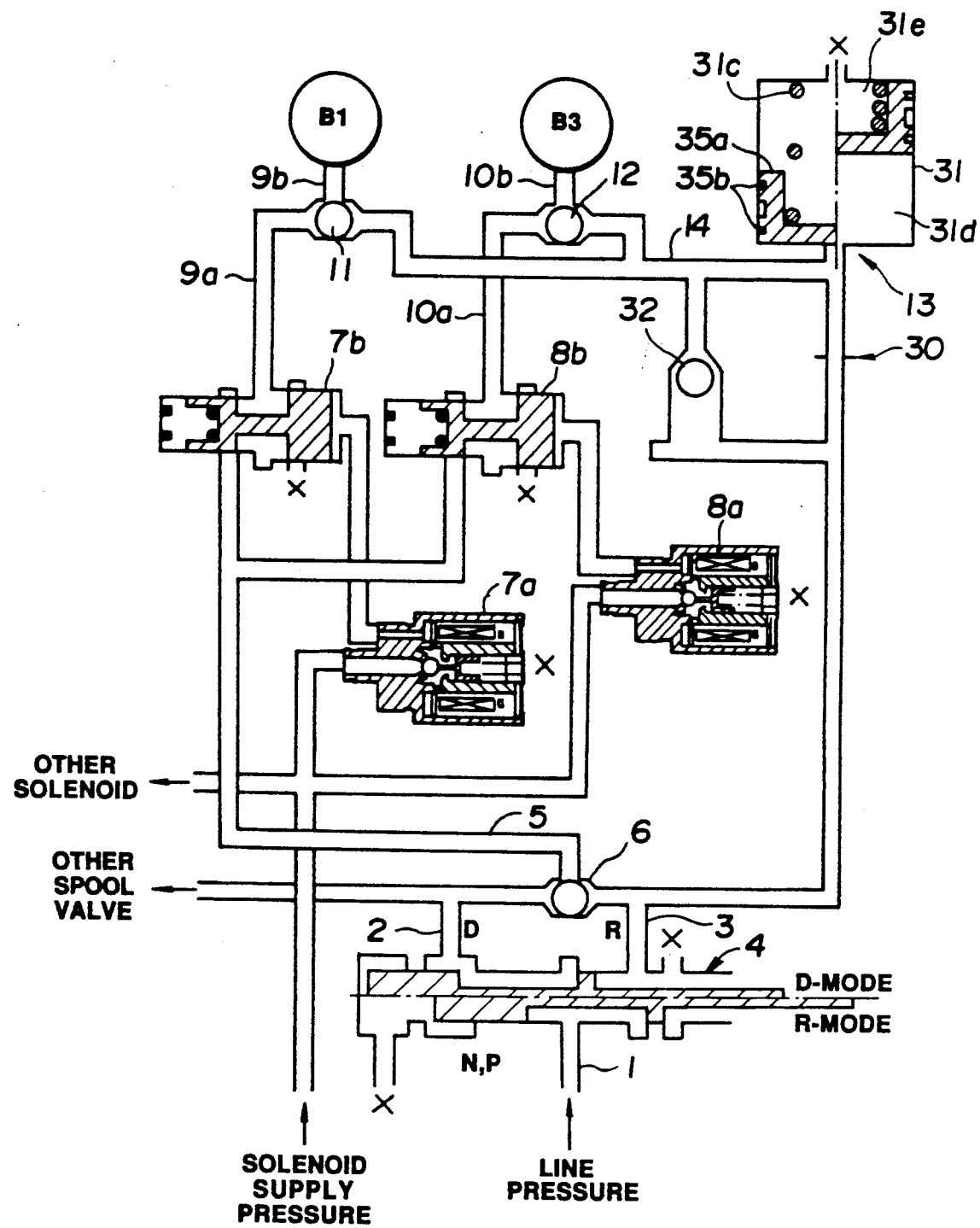
FIG. 10 is a circuit diagram which shows detailed structure of pressure control valves 7 and 8 as shown in FIG. 9.

Referring to FIG. 10, pressure control valves 7 and 8 include three-port solenoid valves 7a and 8a and spool valves 7b and 8b respectively. The solenoid valves 7a and 8a are actuated based on control signals from the A/T control unit 100 to control pressures acting on spools of the spool valves 7b and 8b for modifying pressures supplied to the band brake B1 and the low and reverse brake B3 respectively.

In operation, when the selector lever is shifted to the R range, the A/T control unit 100 outputs control signals to the pressure control valves 7 and 8. The pressure control valve 7 then modifies pressure in the R-range hydraulic line 3 supplied through the shuttle valve 6 and provides it to the band brake B1. The pressure control valve 8 also modifies the pressure in the R-range hydraulic line 3 supplied through the shuttle valve 6 and provides it to the low and reverse brake B3 for establishing the reverse mode.

When the pressure control valves 7 and 8 have failed, the pressure in the R-range pressure delay line 14 is supplied to both the band brake B1 and the low and reverse brake B3 through the shuttle valves 11 and 12 respectively after a preselected period of time following a selector shifting operation to the R range.

It will be noted that a reverse mode is established securely regardless of operational conditions of the pressure control valves 7 and 8.

Figure 11:
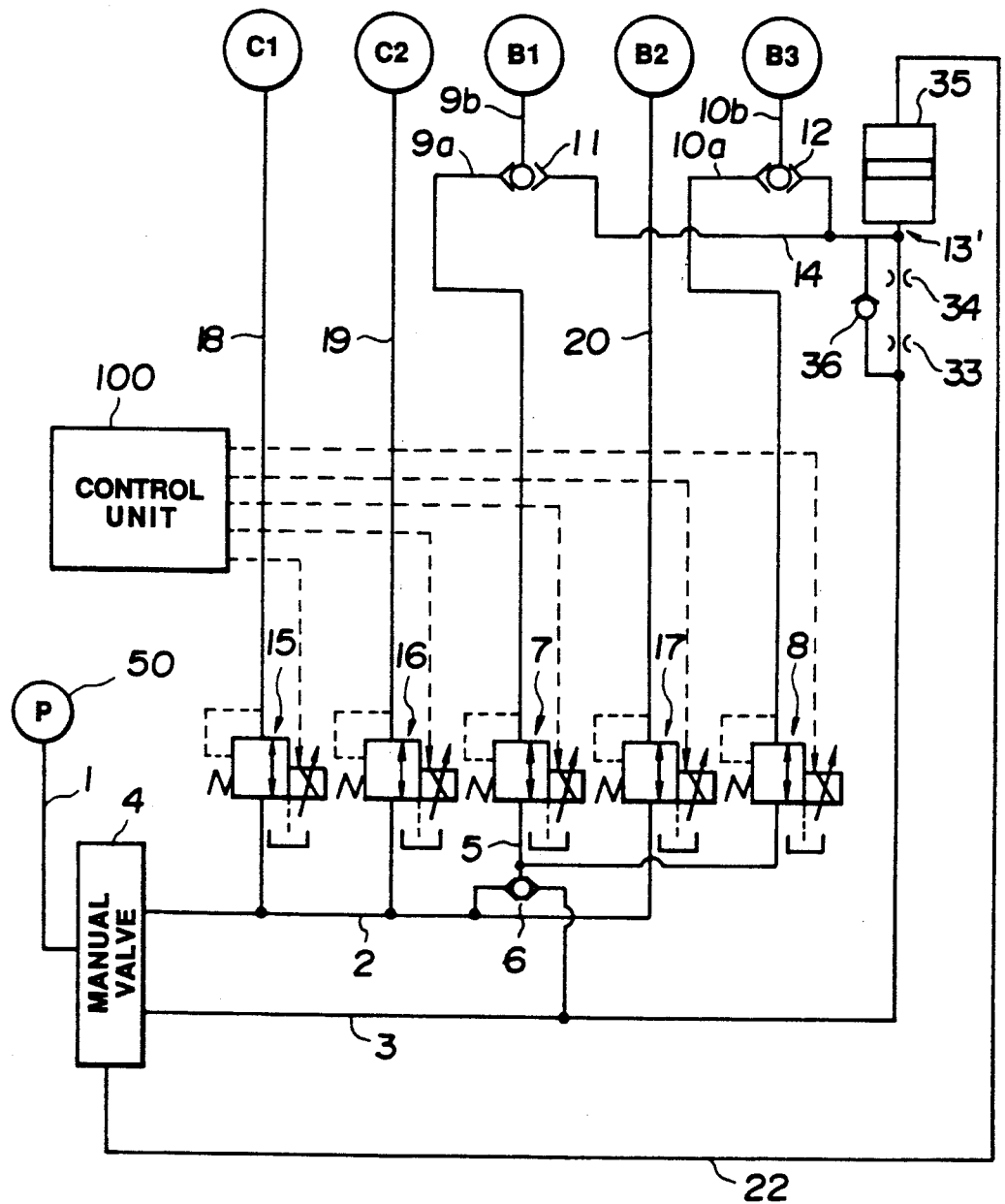
FIG. 11 is a circuit diagram which shows a fail-safe hydraulic control system for an automatic transmission of a sixth embodiment.
Figure 12:
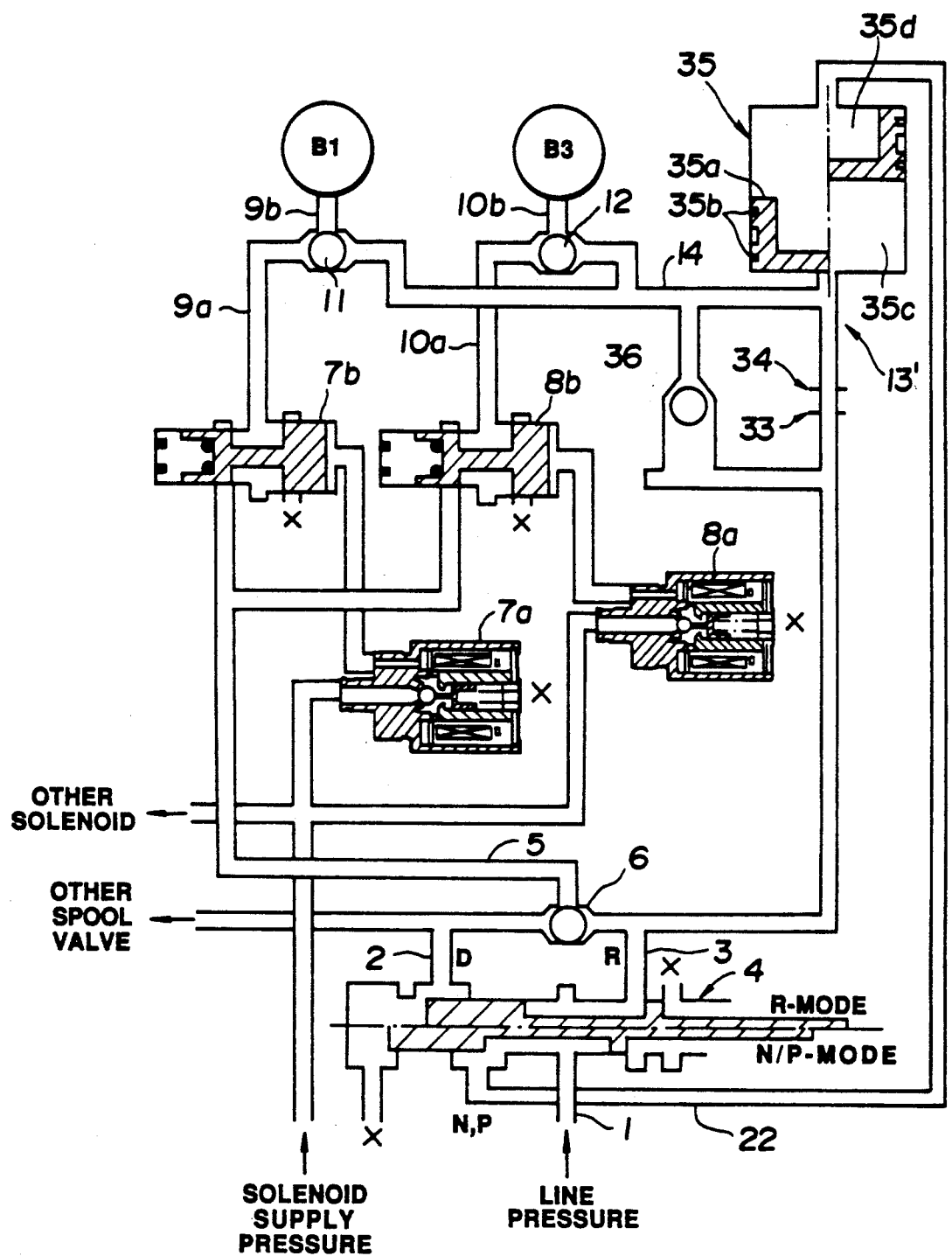
FIG. 12 is a circuit diagram which shows detailed structure of pressure control valves 7 and 8 as shown in FIG. 11.

Referring to FIG. 11, a sixth embodiment of a fail-safe hydraulic control system for an automatic transmission is shown. This fail-safe hydraulic control system is different from the above fifth embodiment in that a pressure delay means 13' includes an accumulator 35, first and second orifices 33 and 34 arranged in series, and a check valve 36 arranged parallel to the orifices 33 and 34. The accumulator 35 has the same structure as the second embodiment wherein the accumulator 35 includes a back pressure chamber 35d, as shown in FIG. 12, into which pressure in a P/N range hydraulic line 22 is introduced as back pressure.

The system operation when the pressure control valves 7 and 8 are in normal operating conditions is the same as the fifth embodiment, and the delay means operation is the same as the second embodiment, therefore, explanation thereof in detail will be omitted here.

What is claimed is:

1. A fluid control system for an automatic transmission for a vehicle comprising:
   a frictional element operable to establish a reverse mode in the automatic transmission for allowing the vehicle to move backward;
   a pressure control valve operable to modify fluid pressure supplied from a pressure power source for providing a preselected pressure level required for actuating said frictional element;
   a manual valve, responsive to a shifting operation of a selector lever to a reverse position, for establishing fluid communication between the pressure power source and a reverse position pressure line which is connected to said frictional element and which by-passes said pressure control valve;
   a control unit responsive to the selector lever shifting operation to the reverse position to provide a control signal to said pressure control valve for providing the preselected pressure level to said frictional element within a given period of time following the selector lever shifting operation; and
   pressure delay means, disposed in the reverse position pressure line, for providing the preselected pressure level to said frictional element after said given period of time following the selector lever shifting operation to the reverse position.

2. A fluid control system as set forth in claim 1, wherein said pressure delay means includes a spring type accumulator and an orifice, the accumulator including an accumulator chamber into which pressure in the reverse position pressure line is introduced through the orifice.

3. A fluid control system as set forth in claim 1, wherein said pressure delay means includes an accumulator and an orifice, the accumulator including a piston therein which defines an accumulator chamber into which pressure in the reverse position pressure line is introduced through the orifice and a back pressure chamber into which pressure created in a preselected position of the selector lever other than the reverse position is introduced.

4. A fluid control system as set forth in claim 1, further comprising a shuttle valve which has first and second shuttle valve positions, the first shuttle valve position being to establish fluid communication between said frictional element and said pressure control valve, the second shuttle valve position being to establish fluid communication between said frictional element and said pressure delay means.

5. A fluid control system as set forth in claim 4, wherein said manual valve has first and second manual valve positions, the first manual valve position being to establish fluid communication between the pressure power source and a drive position pressure line when the selector lever is shifted to a drive position, the second manual valve position being to establish fluid communication between the pressure power source and the reverse position pressure line when the selector lever is shifted to the reverse position, a second shuttle valve being further provided which has a first shuttle valve position establishing fluid communication between the drive position pressure line and said pressure control valve and a second shuttle valve position establishing fluid communication between the reverse position pressure line and the pressure control valve.

6. A fluid control system as set forth in claim 5, wherein said pressure delay mens includes an accumulator, an orifice, and a check valve, the accumulator including an accumulator chamber into which pressure in the reverse position pressure line is introduced through the orifice, the check valve being arranged parallel to the orifice for allowing fluid flow from the accumulator chamber to said manual valve.

7. A fluid control system as set forth in claim 4, wherein said pressure control valve is connected to the pressure power source through a fluid pressure line by-passing said manual valve.

8. A fluid control system as set forth in claim 1, wherein said control unit provides the control signal to said pressure control valve for elevating pressure supplied to said frictional element toward the preselected pressure level at a first rate within said given period of time.

9. A fluid control system as set forth in claim 8, wherein said pressure delay means elevates pressure in the reverse position pressure line toward the preselected pressure level at a second rate lower than said first rate.

10. A fluid control system for an automatic transmission for a vehicle comprising:
    first and second frictional elements operable to establish a reverse mode in the automatic transmission for allowing the vehicle to move backward when both the first and second frictional elements are actuated;
    a manual valve including first and second manual valve positions, the first manual valve position being to establish fluid communication between a pressure power source and a drive position pressure line when a selector lever is shifted to a drive position for establishing a drive mode allowing the vehicle to move forward, the second manual valve position being to establish fluid communication between the pressure power source and a reverse position pressure line when the selector lever is shifted to a reverse position for establishing the reverse mode;
    a first pressure control valve, connected between said first frictional element and the drive position pressure line, for providing a first preselected pressure level required for actuating said first frictional element in the drive mode;
    a second pressure control valve, connected between the second frictional element and the reverse position pressure line, for providing a second preselected pressure level required for actuating said second frictional element in the reverse mode;
    a fluid pressure line connected between the first frictional element and the reverse position pressure line and by-passing the second pressure control valve;
    a control unit, responsive to the selector lever shifting operation to the reverse position, to provide a control signal to said second pressure control valve for providing the second preselected pressure level to said second frictional element within a given period of time following the selector lever shifting operation; and pressure delay means communicating between the reverse position pressure line and the second frictional element for providing the second preselected pressure level to said second frictional element after said given period of time following the selector level shifting operation to the reverse position.

11. A fluid control system as set forth in claim 10, wherein said pressure delay means includes an accumulator, an orifice, and a check valve, the accumulator including an accumulator chamber into which pressure in the reverse position pressure line is introduced through the orifice, the check valve being arranged parallel to the orifice for allowing fluid flow from the accumulator chamber to said manual valve.

12. A fluid control system as set forth in claim 11, wherein said first pressure control valve is connected to the pressure power source through a second fluid pressure line by-passing said manual valve.

13. A fluid control system as set forth in claim 10, further comprising first and second shuttle valves, the first shuttle valve having a first shuttle valve position communicating between the first frictional element and the first pressure control valve and a second shuttle valve position communicating between the first frictional element and said fluid pressure line, the second shuttle valve having a first shuttle valve position communicating between the second frictional element and the second pressure control valve and a second shuttle valve position communicating between the second frictional element and the pressure delay means.

14. A fluid control system as set forth in claim 11, wherein said fluid pressure line connects between the first frictional element and the reverse position pressure line through said pressure delay means.

15. A fluid control system as set forth in claim 14, further comprising first and second shuttle valves, the first shuttle valve having a first shuttle valve position communicating between the first frictional element and the first pressure control valve and a second shuttle valve position communicating between the first frictional element and said fluid pressure line, the second shuttle valve having a first shuttle valve position communicating between the second frictional element and the second pressure control valve and a second shuttle valve position communicating between the second frictional element and said fluid pressure line.

16. A fluid control system as set forth in claim 15, wherein said manual valve has first and second manual valve positions, the first manual valve position being to establish fluid communication between the pressure power source and a drive position pressure line when the selector lever is shifted to a drive position, the second manual valve position being to establish fluid communication between the pressure power source and the reverse position pressure line when the selector lever is shifted to the reverse position, a third shuttle valve being further provided which has a first shuttle valve position establishing fluid communication between the drive position pressure line and said first pressure control valve and a second shuttle valve position establishing fluid communication between the reverse position pressure line and the first pressure control valve, said control unit being further responsive to the selector lever shifting operation to provide a second control signal to said first control pressure valve for providing the first preselected pressure level to said first frictional element.

17. A fluid control system as set forth in claim 16, wherein said second pressure control valve is connected to a portion between the first pressure control valve and the third shuttle valve.

18. A fluid control system as set forth in claim 17, wherein said pressure delay means includes an accumulator and an orifice, the accumulator including a piston therein which defines an accumulator chamber into which pressure in the reverse position pressure line is introduced through the orifice and a back pressure chamber into which pressure created in a preselected position of the selector lever other than the reverse position is introduced.

* * * * *